United States Patent [19]

Farnsworth

[11] Patent Number: 4,800,628
[45] Date of Patent: Jan. 31, 1989

[54] WIRE TIGHTENING APPARATUS

[76] Inventor: Jack M. Farnsworth, 440 West Park Ave., Chandler, Ariz. 85224

[21] Appl. No.: 465,006

[22] Filed: Feb. 8, 1983

[51] Int. Cl.⁴ ............... A44B 21/00; A43C 11/00
[52] U.S. Cl. .......................................... 24/71.3
[58] Field of Search .......... 24/71.2, 71.3, 71.1; 211/119.15

[56] References Cited

U.S. PATENT DOCUMENTS

| | | | |
|---|---|---|---|
| 650,322 | 5/1900 | Hocker | 24/71.3 |
| 653,226 | 7/1900 | Forbes | 24/71.2 U X |
| 1,261,505 | 4/1918 | Fitzsimmons | 24/71.3 |
| 1,410,523 | 3/1922 | Allen | 24/71.3 U X |
| 2,577,301 | 12/1951 | Benbow et al. | 24/71.3 |
| 3,874,638 | 4/1975 | Langlie et al. | 24/71.3 X |

Primary Examiner—Philip C. Kannan
Attorney, Agent, or Firm—H. Gordon Shields

[57] ABSTRACT

Wire tightening apparatus includes a pair of pins extending outwardly from a base and a pair of hook lock elements at the outer ends of the pins for locking the wire after it is tightened.

5 Claims, 1 Drawing Sheet

WIRE TIGHTENING APPARATUS

BACKGROUND OF THE INVENTION

Field of the Invention

This invention relates to wire tightening apparatus, and, more particularly, to apparatus for tightening wire that needs to be periodically tightened without unfastening the wire and which accordingly may be left in the wire.

Description of the Prior Art

The tightening of wire, such as on grape trellises, is an annual problem. Typically, in the growing of table grapes, wire is strung between supporting "T" shaped support elements. The wire is normally stapled to the top of the cross arms of the "T" shaped support elements. During the course of the growing season, the wire lengthens and sags. It is accordingly necessary between the end of one growing season and the beginning of another growing season to tighten the wire to eliminate the slack.

Prior to the development of the apparatus of the present invention, the wire was tightened annually by releasing one end of the wire, that is, by unfastening one end of the wire, and then taking up the slack in the wire and resecuring the wire to the end post. Obviously, such procedure is strictly manual and accordingly requires a great deal of time. Since the operation is time consuming and manual, expenses associated therewith are relatively high.

To the best of the knowledge of the inventor, there has been no mechanical means of tightening the wire prior to the inventor's development of the apparatus of the present invention.

SUMMARY OF THE INVENTION

The invention described and claimed herein comprises wire tightening apparatus including a pair of pins spaced apart and secured to a base element and adapted to have wire to be tightened wrapped around the pins. The distal ends of the pins, remote from the base, are in a hooked configuration and define locking elements for preventing the inadvertent release of the slack wire wrapped around the pins. A shank extends outwardly from the base for receiving an appropriate socket for turning or twisting the locking apparatus.

Among the objects of the present invention are the following:

To provide new and useful wire tightening apparatus;

To provide new and useful apparatus for tightening a wire between the ends of the wire;

To provide new and useful apparatus for picking up the slack in a suspended wire;

To provide new and useful apparatus for tightening a wire and for locking the tightened wire in place; and To provide new and useful apparatus for tightening wire on a grape trellis.

DESCRIPTION OF THE PREFERRED EMBODIMENT

Figure 1:
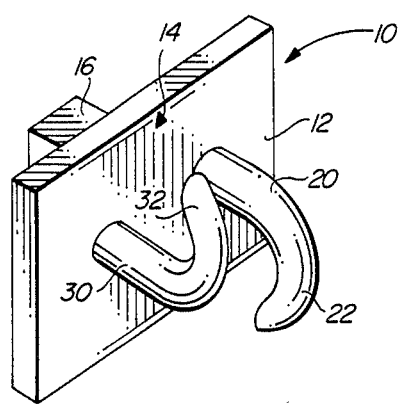
FIG. 1 is a perspective view of the apparatus of the present invention.
Figure 2:
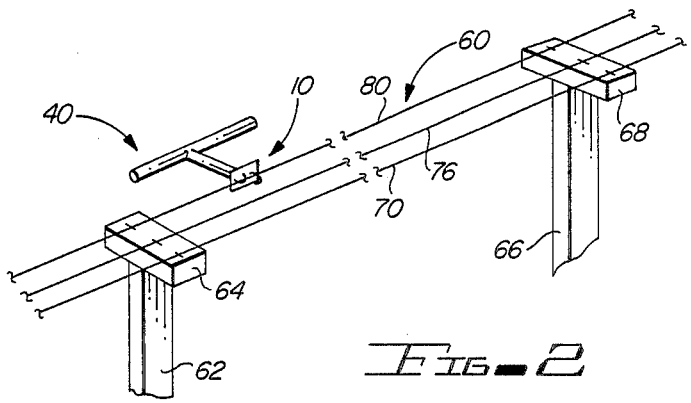
FIG. 2 is a perspective view of the apparatus of the present invention shown in its use environment.
Figure 3:
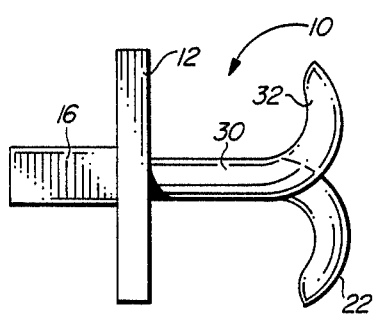
FIG. 3 is a side view of the apparatus of the present invention.
Figure 4:
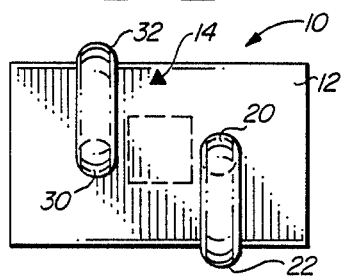
FIG. 4 is an end view of the apparatus of the present invention.
Figure 5:
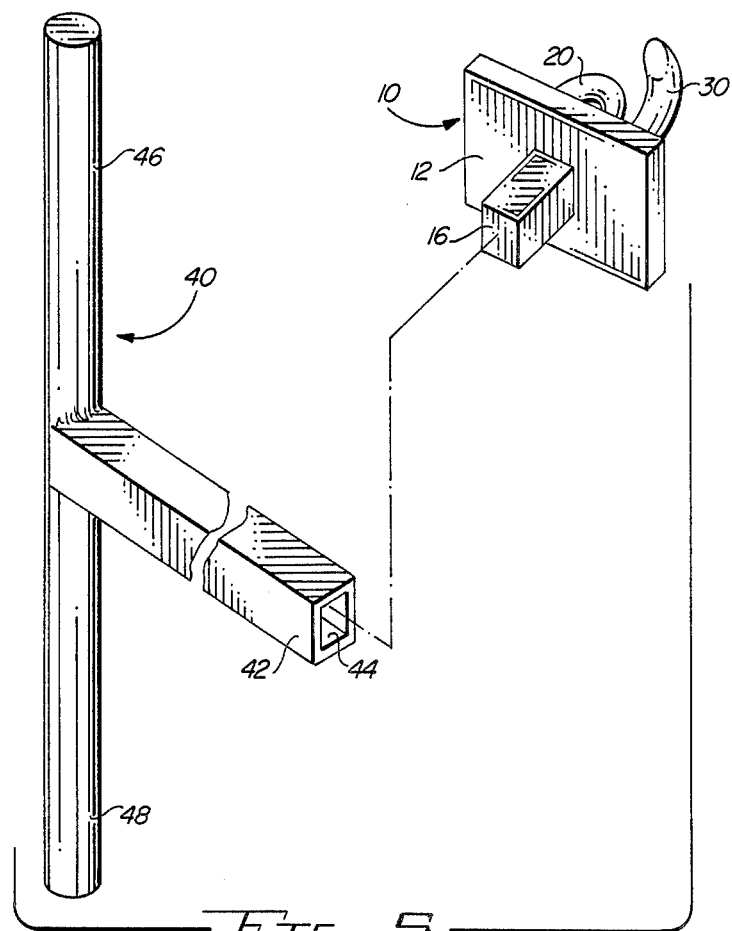
FIG. 5 is a perspective view of the apparatus of the present invention shown spaced apart from a tool adapted for use with the apparatus of the present invention.

FIG. 1 is a perspective view of wire tightening apparatus 10 of the present invention. FIG. 2 is a perspective view of the apparatus 10 in a use environment. FIG. 3 is a side view of the apparatus 10, and FIG. 4 is an end view of the apparatus 10. FIG. 5 is a perspective view of the apparatus 10 showing the apparatus spaced apart from a tool 40 which is usable with the apparatus 10. The wrench tool 40 is also shown in FIG. 2. For the following discussion, reference will primarily be made to FIGS. 1, 2, 3, 4, and 5.

The wire tightening apparatus 10 includes a base plate 12 and a pair of pins 20 and 30 extending outwardly from one side of the base plate 12. The pins 20 and 30 are spaced apart from each other and are substantially parallel to each other. The two pins 20 and 30 are substantially perpendicular to the plate 12. At the distal ends of the pins 20 and 30, remote from the plate 12, are a pair of hook elements 22 and 32, respectively. The hook elements 22 and 32 extend generally parallel to each other but in opposite directions.

On the opposite side of the base plate 12 from the pins 20 and 30 is a shank 16. The shank 16 is generally centered with respect to the plate 12 and to the pins 20 and 30. It is preferably of a square configuration, adapted to extend into a square socket of a tool used to turn the apparatus 10.

FIG. 2 is a perspective view of the apparatus 10 disposed adjacent to a grape trellis 70. The grape trellis 70 comprises a use environment of the apparatus 10. The trellis 70 includes a pair of support poles 62 and 66. The pole 62 and 66 are spaced apart from each other. Extending across the top of the pole 62 is a cross arm 64. Extending across the top of the support pole 66 is a cross arm 68. The cross arms with their support poles define generally "T" shaped support elements for supporting three wires. The three wires include a wire 70, a wire 76, and a wire 80. As is obvious, a grape trellis will usually include more than two support poles. For purposes of illustrating the present invention, only a pair of support poles with wires extending between them are illustrated in FIG. 2. The wires are preferably stapled to the top of the cross arms 64 and 68.

During the course of a growing season, the wires, such as the wires 70, 76, and 80, are stretched. The extra length of the stretched wires needs to be substantially eliminated so as to provide relatively taut wires for the new growing season. The apparatus 10 is accordingly used to substantially eliminate the slack accumulated during the previous growing season from the wires.

In FIG. 3, the apparatus 10 is shown from the side, with the hooks 22 and 32 extending outwardly from their respective pins. It will be noted that the hooks 22 and 32 extend outwardly substantially perpendicularly to the pins and that there is a slight backward or rearward curl to the hooks. In the top view of FIG. 4, the hooks 22 and 32 are again shown. It will be noted that the hooks do not extend toward each other, and they are not aligned with each other. Rather, they extend in opposite directions from their respective pins, and they are generally parallel to each other.

For convenience in twisting the wire tightening apparatus 10, the square shank 16 is used in conjunction with a wrench tool 40, best shown in FIG. 5. The wrench tool 40 includes a socket arm 42 which terminates in a socket 44. The socket 44 is square and it receives the square shank 16 of the wire tightening apparatus 10.

The wrench tool 40 also includes two handles 46 and 48. The handles 46 and 48 extend outwardly from the socket arm 42. It will be noted that the socket arm 42 and the handles 46 and 48 define a "T" shaped tool which is easily manipulated by a user The length of the socket arm 42 and the length of the handles 46 and 48 may vary, depending on the user. The handles 46 and 48 should be long enough to allow a user to conveniently hold the tool 40 and to rotate the tool 40, thus rotating the apparatus 10 which is secured to the tool 40 by the socket engagement between the shank 16 and the socket 44.

Figure 6A:
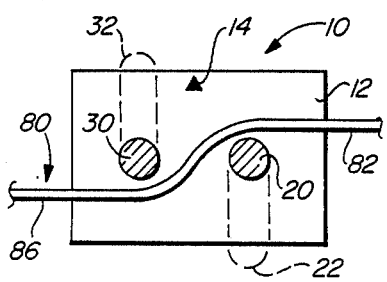
FIGS. 6A, 6B, and 6C are sequential views illustrating the operation of the apparatus of the present invention.
Figure 6B:
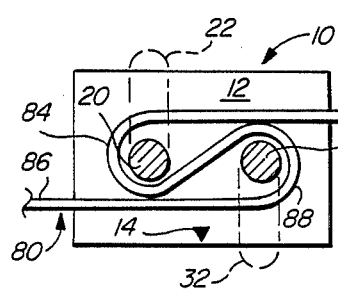
Figure 6C:
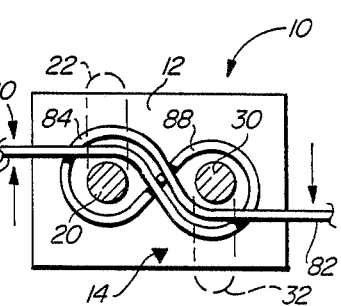

For convenience of illustrating the apparatus of the present invention, an index mark 14 is shown on the base 12 in FIG. 4 and also in FIGS. 6A, 6B, and 6C.

It will also be noted that, again for convenience of illustration, the hooks 22 and 32 are shown only in phantom or dotted line in FIGS. 6A, 6B, and 6C. In addition, and also for convenience in explaining the illustrations of FIGS. 6A, 6B, and 6C, particularly FIG. 6C, the wire 80 has been given additional reference numerals. The right hand end of the wire, on one side of the pin 20 in FIG. 6A, is designated as end 82, and the left end of the wire, oppositely or outboard from the pin 30 in FIG. 6A, is designated as wire end 86.

The apparatus 10 is shown in FIG. 6A as being disposed onto the wire 80. It will be noted that the wire 80 is oriented between the pins 20 and 30 and generally along the length of the base 12. That is, the pins 20 and 30, and their hooks 22 and 32, respectively, are substantially perpendicular to the length of the wire 80.

The index mark 14 is pointing up, or towards the top of the base 12. It will be noted that the index mark 14 is shown in the drawing only for convenience in illustrating the functioning of the apparatus. An index mark is not required for normal use and accordingly will not be employed on production runs of the apparatus.

In FIG. 6B, the base 12 is shown rotated 180° in a counterclockwise direction. The index mark 14 is now at the bottom of the Figure, indicating the 180° rotation of the base 12 and the apparatus 10. An arrow to the right of the base 12 in FIG. 6B indicates the direction of rotation, which is counterclockwise from the viewer's point of view.

In the view of FIG. 6B, the slack in the wire 80 has now been taken up by the rotation of the pins 20 and 30 on the base 12. The slack in the wire 80 now includes two loops, namely a loop 84 and a loop 88. The loop 84 is disposed about the pin 20, and the loop 88 in the wire end 86 is disposed about the pin 30.

For locking the wire 80 to the apparatus 10, the base 12 is moved slightly so that the hooks 22 and 32 engage the ends of the wires. Initially, the base 12 is moved through the maneuvering of the wrench tool 40. The movement of the base 12 is for the purpose of having the oppositely extending ends 82 and 86 of the wire 80 disposed beneath the hooks 32 and 22, respectively, as shown in FIG. 6C. One end of the wire 80, for example the end 82, is first maneuvered beneath a hook, such as the hook 32. Then the tool 40 is again used to maneuver the base 12 so that the other wire end, the end 86, is disposed beneath the hook 22 and on the opposite side of the pin 20 from that shown in FIG. 6B. It will be noted that the end 82 of the wire 80 is also on the opposite side of the pin 30 from that shown in FIG. 6B. In FIG. 6C, arrows adjacent to the wire ends 82 and 86 indicate the movement of the wire ends from the positions shown in FIG. 6B to lock the wire 80 beneath the hooks 32 and 22, respectively.

With both wire ends 82 and 86 disposed beneath the hooks 32 and 22, respectively, as shown in FIG. 6C, the wire 80 is locked in place on the apparatus 10. The hooks 22 and 32 prevent the inadvertent release of the apparatus 10 from the wire 80.

The wire 80 wrapped about the pins 20 and 30 resembles a figure "8", as shown in FIG. 6C. With the wire 80 wrapped about the pins 20 and 30, and the "outer ends" of the wires disposed beneath the hooks 22 and 32, the apparatus 10 is now secured in place on the wire 80. The wrench tool 40 may thereupon be removed from the apparatus 10, and the apparatus 10 will remain with the wire.

The force of gravity will cause the apparatus 10 to move to a particular orientation with respect to the wire 80. However, as long as the ends 82 and 86 are disposed beneath the hooks 22 and 32, respectively, the wire 80 will not slip off the pins 20 and 30. Rather, the wire 80 is secured to the base 12 and about the pins 20 and 30 in a relatively confined manner.

In order to remove the apparatus 10 from the wire 80, the wire ends 82 and 86 must be moved from beneath the hooks 32 and 22 of the pins 30 and 20, respectively. As long as the wire ends 82 and 86 are disposed beneath the hooks 32 and 22, the wire 80 will remain secured to the apparatus.

Generally speaking, a single 180° rotation of the apparatus 10 with respect to the wire 80 is sufficient to take up the slack which accumulates in a wire during a single year, or a single growing season. That is, the spacing of the pins 20 and 30 is sufficient to allow a one-year's takeup in wire slack by a single 180° rotation of the apparatus 10. However, if additional slack needs to be taken up by the apparatus 10, the user simply continues to rotate the apparatus 10 for, say, another 180° rotation before the ends 82 and 86 are locked in place by moving them beneath the hooks.

After the next growing season of a grape crop, the wire 82 will again have slack in it, and the slack again needs to be removed from the wire. This is accomplished by releasing or removing (unhooking) the ends 82 and 86, respectively, from beneath the hooks 32 and 22. The wire 80 then returns to the appearance as shown in FIG. 6B.

With the wire 80 unhooked from beneath the hooks 22 and 32, the wire then appears in the same manner shown in FIG. 6B, with the two loops 84 and 88 disposed about the pins 20 and 30, respectively. The tool 40, which is used with the apparatus 10 to unhook the wire ends 82 and 86, is then used to rotate the apparatus 10 another 180° (not shown) in the same direction as originally turned. The second 180° picks up an additional length of slack in the wire 80. Thus, there will be a double loop around each pin 20 and 30.

After the double loop has been acquired, the ends 82 and 86 are again disposed beneath the hooks to lock the apparatus 10 to the wire 80. The locking or hooking of the wire 80 is accomplished in the same manner as discussed above. That is, the wire end 82 is again maneuvered beneath its adjacent hook, and the wire end 86 is maneuvered beneath its adjacent hook. A double figure "8" would appear in place of the single figure "8" shown in FIG. 6C, due to the double loops of wire about the pins 20 and 30. Once the wire ends 82 and 86 are locked into place about the pins 20 and 30 and beneath the hooks, the wrench tool 40 is again removed from the shank 16 of the apparatus 10, and the user goes to the next length of wire for taking up its slack.

With the apparatus 10 made of galvanized material, that will not easily rust, it is obvious that the apparatus 10 may be left in place along the wires of a grape trellis for a number of years without ever having any problems or difficulties therewith. The wire of which the trellises are made is generally high quality galvanized wire so that it, also, resists rusting. Thus, with the apparatus 10 made of similar quality material, with a galvanized coating that will not rust, the apparatus 10 may be left on a grape wire for a number of years without causing any problems. Each year, however, the wire ends are removed from beneath the hooks in order to unlock the apparatus 10 with respect to the wire 80, and the apparatus 10 is then rotated at least 180° in the same direction as the previous year's rotation in order not to disturb the wire then wrapped about the pins 20 and 30 of the apparatus. Generally speaking, a single 180° rotation of the apparatus 10 is sufficient to take up each year's slack in the wire. However, periodically it may be necessary to rotate the apparatus 360° instead of the more typical 180°. Regardless of the number of turns made, the last step in substantially eliminating the slack in a wire is to lock the wire in place by causing the ends of the wire to be disposed beneath the hooks on the pins In this manner, the wire is locked to the apparatus 10 between successive or seasonal tightenings of the wire to remove the slack.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Wire tightening apparatus comprising, in combination:
    a base plate;
    a first pin extending outwardly from the base plate substantially perpendicularly thereto;
    a first hook disposed on the first pin and extending in a first direction;
    a second pin extending outwardly from the base plate and spaced apart from the first pin and substantially parallel to the first pin and substantially perpendicular to the base plate;
    a second hook disposed on the second pin and extending in a second direction substantially parallel to the first hook but in the opposite direction; and
    shank means secured to the base plate and substantially parallel to the first and second pins for rotating the base plate to wrap wire to be tightened around the first and second pins and to lock the wire to the apparatus by hooking the wire beneath the first and second hooks.

2. The apparatus of claim 1 in which the base plate includes a first and a second side, and the first and second pins extend outwardly from the first side.

3. The apparatus of claim 2 in which the shank means is secured to and extends outwardly from the second side of the base plate.

4. The apparatus of claim 3 in which the shank means is adapted to be secured to a tool for rotating the base plate and the pins for wrapping the wire around the pins and for hooking the wire beneath the hooks.

5. Apparatus for tightening wire by taking up slack in the wire, comprising, in combination:
    base means, including a base plate;
    pin means secured to the base plate and extending outwardly therefrom and substantially perpendicular thereto for receiving the slack wire, including a first pin and a second pin substantially parallel to and spaced apart from the first pin; and
    hook means secured to the pin means for locking the wire to the pin means, including a first hook secured to the first pin extending in a first direction and a second hook secured to the second pin extending in a second direction, and the first and second directions are generally opposite from each other.

* * * * *